United States Patent [19]

Kawai

[11] Patent Number: 5,258,623
[45] Date of Patent: Nov. 2, 1993

[54] POSITIONING APPARATUS FOR OPTICAL ELEMENT MOUNTING OPERATION HAVING A POSITIONING LIGHT RECEIVING ELEMENT FORMED ON AN OPTICAL ELEMENT SUBSTRATE

[75] Inventor: Shigeru Kawai, Tokyo, Japan
[73] Assignee: NEC Corporation, Tokyo, Japan
[21] Appl. No.: 996,667
[22] Filed: Dec. 24, 1992
[30] Foreign Application Priority Data Dec. 25, 1991 [JP]  Japan ............................. 3-357877

[51] Int. Cl.$^5$ ............................................. G01V 9/04
[52] U.S. Cl. ..................................... 250/561; 356/400
[58] Field of Search ............ 250/561, 548, 557, 206.2, 250/206.3; 356/400, 401

[56] References Cited
U.S. PATENT DOCUMENTS 4,333,044  6/1982  Blitchington .................. 250/561
5,155,370  10/1992  Osawa et al. .................. 250/548

OTHER PUBLICATIONS

M. Oikawa et al., "Proceedings of SPIE-The International Society for Optical Engineering" published by Miniature Optics and Lasers, Jan. 11-12, 1988, pps. SPIE vol. 898/3-SPIE vol. 898/11.

Primary Examiner—David C. Nelms
Assistant Examiner—Que T. Le

[57] ABSTRACT

A positioning apparatus for an optical element mounting operation includes a transparent substrate, a light source, an optical element substrate, a measuring unit, a manipulator, and a control unit. At least one positioning lens and an optical system are formed on a surface of the transparent substrate. The light source emits parallel beams which are vertically incident on the transparent substrate. A plurality of optical elements to be positioned with respect to the transparent substrate, and a positioning light-receiving element for receiving light focused by the positioning lens are formed on the optical element substrate. The current measuring unit measures a current flowing in the positioning light-receiving element. The manipulator moves the transparent substrate with respect to the optical element substrate to perform positioning of the former with respect to the latter. The control unit controls the manipulator on the basis of a current measured by the current measuring unit to perform positioning of the transparent substrate with respect to the optical element substrate.

6 Claims, 4 Drawing Sheets

POSITIONING APPARATUS FOR OPTICAL ELEMENT MOUNTING OPERATION HAVING A POSITIONING LIGHT RECEIVING ELEMENT FORMED ON AN OPTICAL ELEMENT SUBSTRATE

BACKGROUND OF THE INVENTION

The present invention relates to a positioning apparatus for a mounting operation of two-dimensional planar optical elements.

With the recent progress in the semiconductor process techniques, planar optical devices such as surface emission lasers, MQW planar spatial optical modulation elements, and pnpn optical switching elements, and two-dimensional arrays thereof can be considered for practical applications. It is expected that such elements will be applied to the fields of optical communications and optical information processing, which essentially demand multichannel systems, by utilizing not only the velocity of light but also the nature of the light that light beams do not interfere with each other.

For such a purpose, techniques of mounting optical semiconductor elements and optical components are important. For example, optical fiber communications have been enabled with the advent of an optical module as a block formed by integrating components in an appropriate scale. As such an optical module, a module for a one-dimensional LED and a light-receiving element, an advanced type relative to a module for a single element, has recently been studied and developed for application to, e.g., a data link between computers. However, studies of modules for two-dimensional planar optical devices or mounting techniques for the realization of such modules have just begun, and hence there are many problems to be solved.

SUMMARY OF THE INVENTION

It is an object of the present invention to provide a positioning apparatus for optical element mounting operation, which performs positioning of a transparent substrate and a two-dimensional array of optical elements with high precision.

In order to achieve the above object, according to the present invention, there is provided a positioning apparatus for an optical element mounting operation, comprising a transparent substrate on a surface of which at least one positioning lens and an optical system are formed, a light source for emitting parallel beams which are vertically incident on the transparent substrate, an optical element substrate on which a plurality of optical elements to be positioned with respect to the transparent substrate, and a positioning light-receiving element for receiving light focused by the positioning lens are formed, current measuring means for measuring a current flowing in the positioning light-receiving element, a manipulator for moving the transparent substrate with respect to the optical element substrate to perform positioning of the transparent substrate with respect to the optical element substrate, and control means for controlling the manipulator on the basis of a current measured by the current measuring means to perform positioning of the transparent substrate with respect to the optical element substrate.

DESCRIPTION OF THE PREFERRED EMBODIMENTS

The principle of the present invention will be described first with reference to FIGS. 3 and 4.

Figure 3:
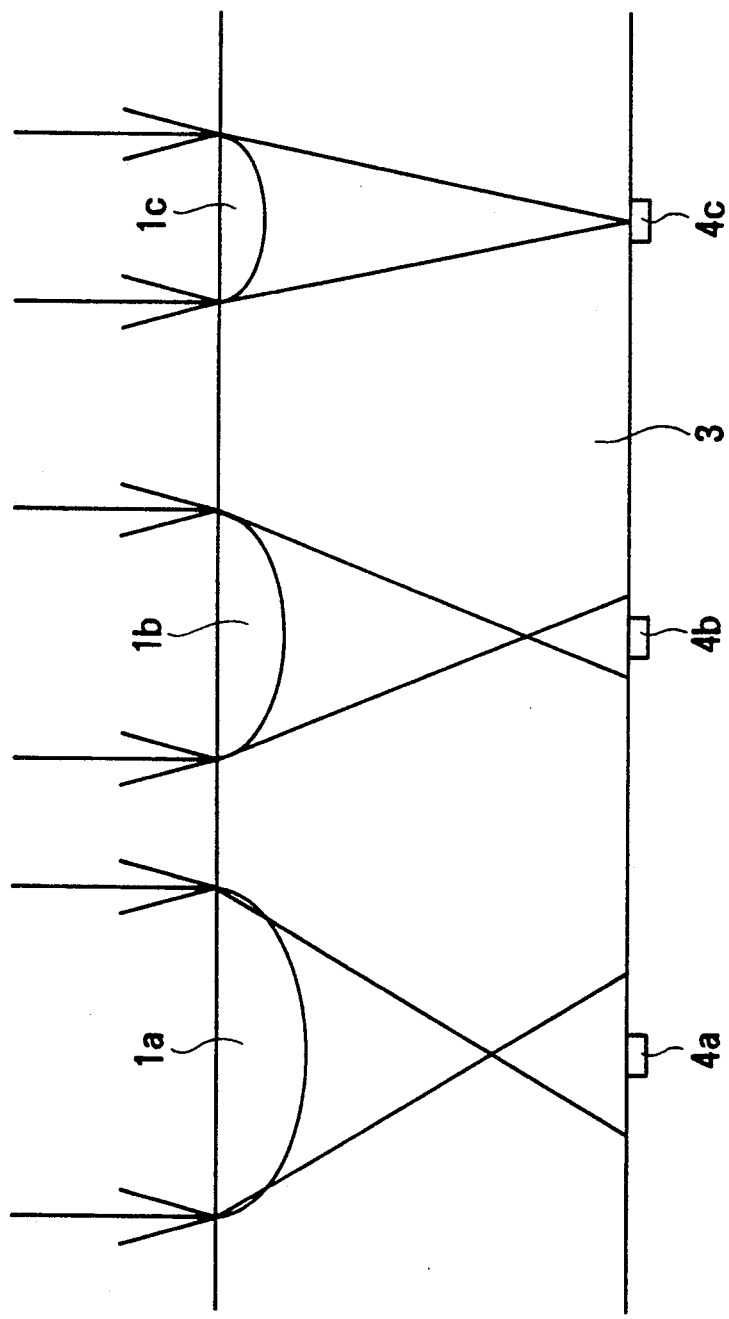
FIG. 3 is a view for explaining the principle of the positioning apparatus in FIG. 1.

FIG. 3 shows the arrangement of a plurality of positioning lenses $1a$ to $1c$. When parallel beams are vertically incident on a transparent substrate 3, the beams are focused by the lenses $1a$ to $1c$. Assume that the lenses $1a$ to $1c$ are formed on the surface of the transparent substrate 3. In this case, a focal point a at which beams from each of the surface portions on which the lenses $1a$ to $1c$ are formed are focused is given by the following equations, letting the focal length of each lens be f, the thickness of the substrate be w, and the refractive index be n: when $f \leq nw$, $$a = nf \quad \text{and} \tag{1}$$

when $f > nw$, $$a = f + (n-1)w \tag{2}$$

If light-receiving elements $4a$ to $4c$ are arranged on a surface to oppose the lenses $1a$ to $1c$, respectively, a focal length f of each of the lenses $1a$ to $1c$ by which beams are focused on a corresponding one of the light-receiving elements $4a$ to $4c$ is given by:

$$f = a/n \tag{3}$$

Assume that the lens $1c$ having a focal length F and lenses $1a$ and $1b$ having a focal length F' (F' < F) are formed on the transparent substrate 3. In this case, the lens $1c$ having the focal length F can ideally focus beams on the light-receiving element $4c$ to a diffraction limit, whereas each of the radii of defocus beams formed by the lenses $1a$ and $1b$ on the surfaces of the light-receiving elements $4a$ and $4b$ is represented as follows:

$$D = (F - F')d/F \tag{4}$$

where d is the radius of the lenses $1a$ and $1b$ having the focal length F'.

Consider positioning of the transparent substrate 3 and the light-receiving elements $4a$ to $4c$. When these elements are combined initially, their positions are indefinite. If the value of the focal point a in equation (3) is determined such that the transparent substrate 3 and the light-receiving elements $4a$ to $4c$ are located at desired relative positions, the focal lengths F of the lenses $1a$ to $1c$ for focusing beams on the light-receiving elements $4a$ to $4c$ can be determined. Assume that the lenses $1a$ to $1c$ having different focal lengths are formed on the surface of the transparent substrate 3, and the light-receiving elements 4a to 4c are formed on an optical element substrate 5 at the same intervals as those of the lenses 1a to 1c. FIG. 4 shows another embodiment, in which a light-receiving element array constituted by light-receiving elements A, B, C, and D and an output circuit are arranged. Referring to FIG. 3, since the lenses 1a to 1c having different focal lengths are formed on the transparent substrate 3, defocus beams having different radii are formed on the light-receiving elements 4a to 4c. That is, the radius of a defocus beam is increased with a decrease in the focal length of a lens. Positioning is performed first with respect to a direction parallel to the surface of the substrate (lateral direction). Since the amounts of these beams spread on a Gaussian distribution, positioning is performed to increase an output from the light-receiving element 4a corresponding to a beam having the maximum defocus amount. When the initial positioning is completed to a certain degree, next positioning is performed to increase an output from the light-receiving element 4b corresponding to a beam having a smaller defocus amount. Finally, positioning is performed to increase an output from the light-receiving element 4c corresponding to a beam having the minimum defocus amount. By sequentially performing positioning in this manner, positioning in the lateral direction with respect to the lenses can be performed. In this state, positioning in the vertical direction can be performed so as to maximize an output from each light-receiving element for receiving a focused beam.

Figure 4:
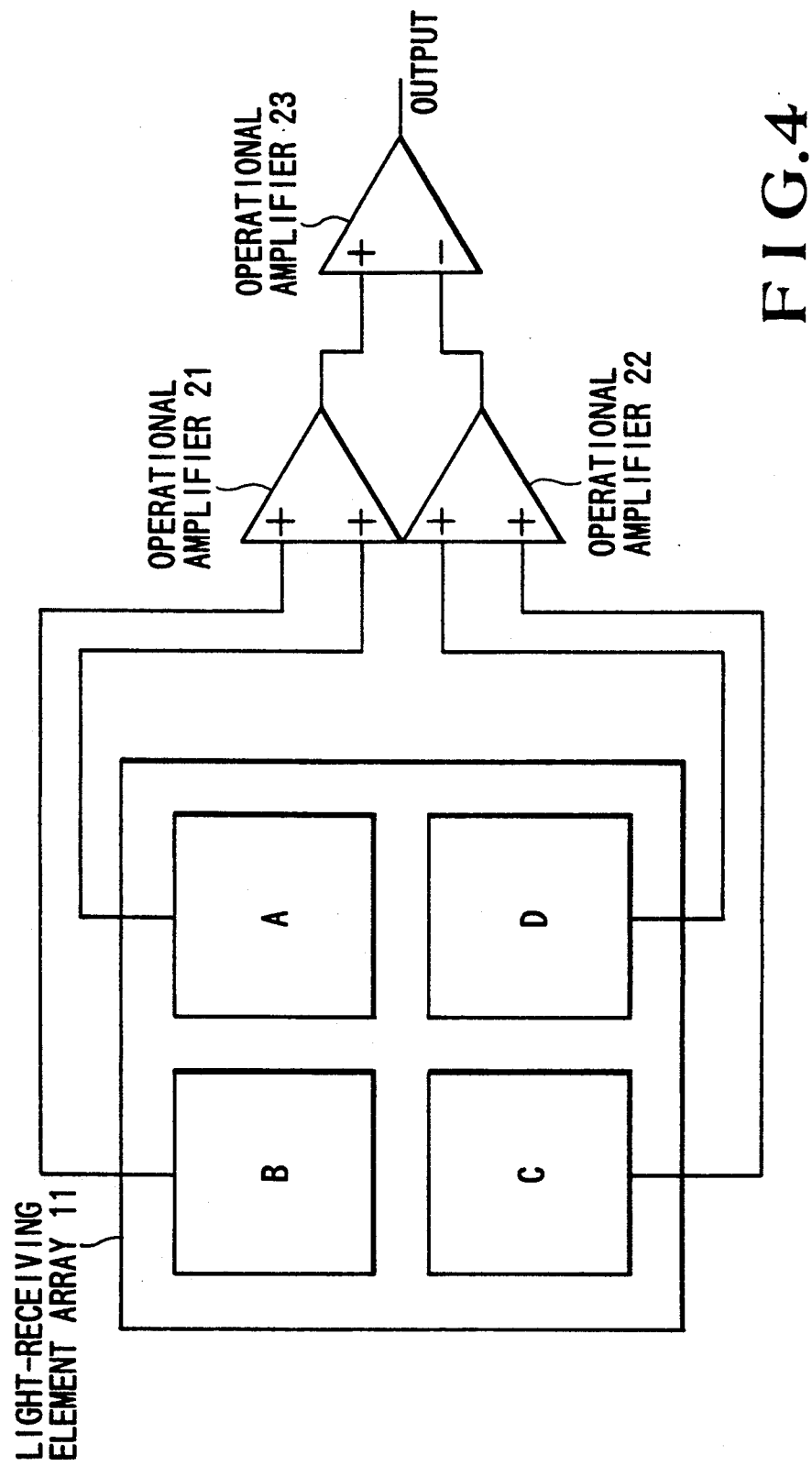
FIG. 4 is a schematic view for explaining the positioning apparatus in FIG. 2.

FIG. 4 shows an application of the principle in FIG. 3. In this case, the principle of positioning is the same as that described with reference to FIG. 3. Referring to FIG. 4, light-receiving elements A to D constitute an array structure, which includes circuits 21 to 23 for causing a beam having an astigmatism, which emerges from each elliptical lens, to be incident on each of the light-receiving elements A to D arranged in an array, so as to obtain a differential signal (A+B)−(C+D) based on signals from the elements A to D. With this arrangement, detection of the peak point of the amount of a beam is facilitated, and the precision of positioning can be further improved.

Embodiments of the present invention will be described below.

Figure 1:
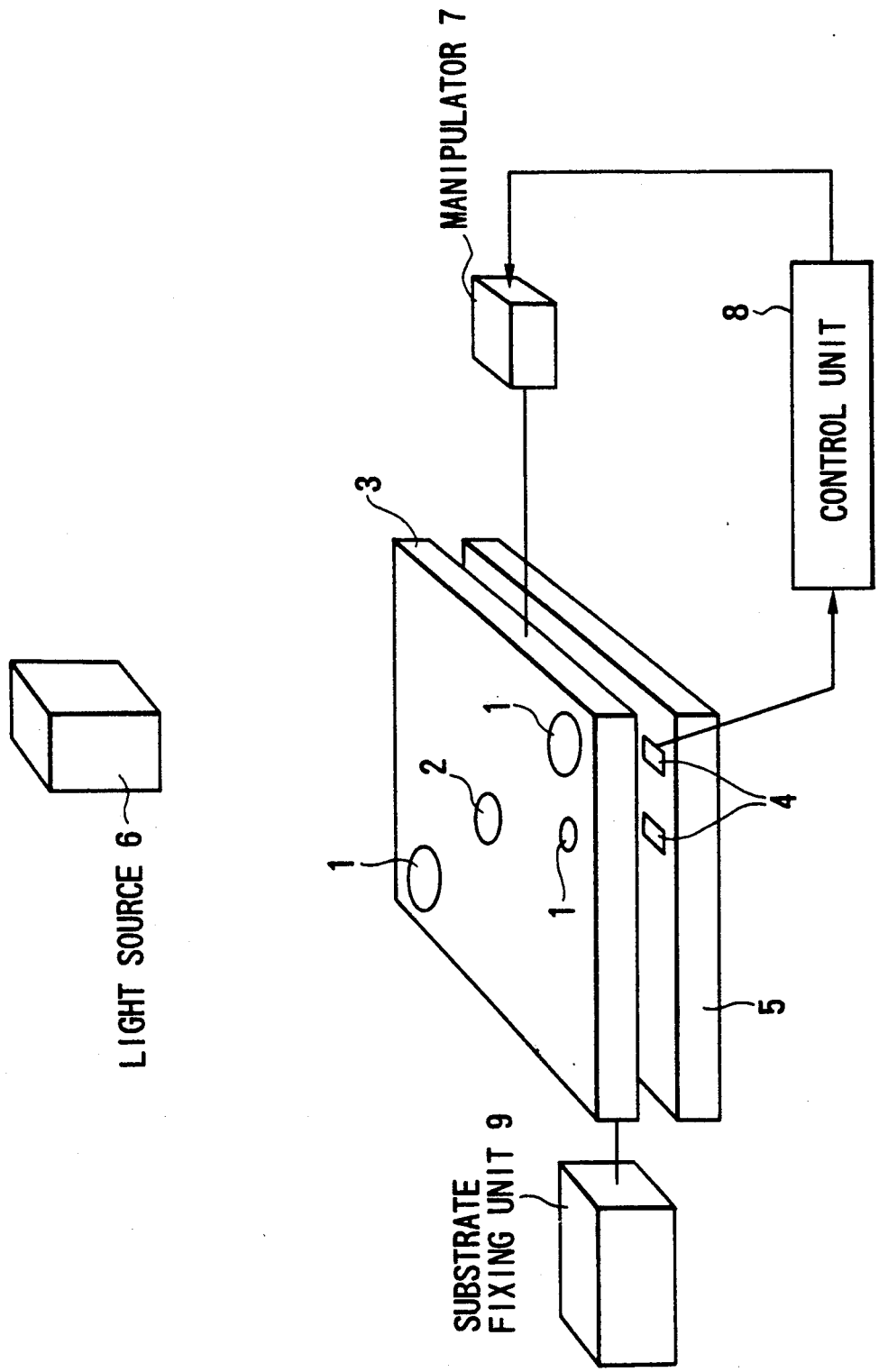
FIG. 1 is a perspective view for explaining a positioning apparatus according to the first embodiment of the present invention.

FIG. 1 shows a positioning apparatus according to the first embodiment of the present invention. This positioning apparatus comprises a plurality of positioning lenses 1 constituted by, e.g., distributed index planar microlenses, a transparent substrate 3 on which an optical component 2 such as a grating or a microlens is formed, a plurality of positioning light-receiving elements 4, an optical element substrate 5 on which elements such as light-emitting elements and light-receiving elements (different from the light-receiving elements 4) are formed, a light source 6 such as a laser for radiating parallel beams on the transparent substrate 3, a manipulator 7 for moving the transparent substrate 3, a control unit 8 such as a personal computer for moving the manipulator 7 to maximize a current flowing in each positioning light-receiving element 4, and a substrate fixing unit 9 for coating a photo-setting resin or the like to the transparent substrate 3 and the optical element substrate 5 so as to fix them together.

A positioning operation will be described next. Parallel beams emitted from the light source 6 are caused to be vertically incident on the positioning lenses 1 on the transparent substrate 3. The control unit 8 receives output currents from the light-receiving elements 4, measures their magnitudes, and moves the manipulator 7 in a direction parallel to the transparent substrate 3 so as to maximize the current flowing in each light-receiving element 4. Positioning is performed with respect to all the light-receiving elements 4 corresponding to the respective positioning lenses 1 in a stepwise manner in accordance with the principle described with reference to FIG. 3. When the manipulator 7 is located at a position where the current flowing in each light-receiving element 4 is maximized, the control unit 8 moves the manipulator 7 in a direction perpendicular to the transparent substrate 3 so as to maximize a current flowing in each light-receiving element 4. When the two substrates 3 and 5 are positioned in this manner, they are fixed to each other by the substrate fixing unit 9.

Figure 2:
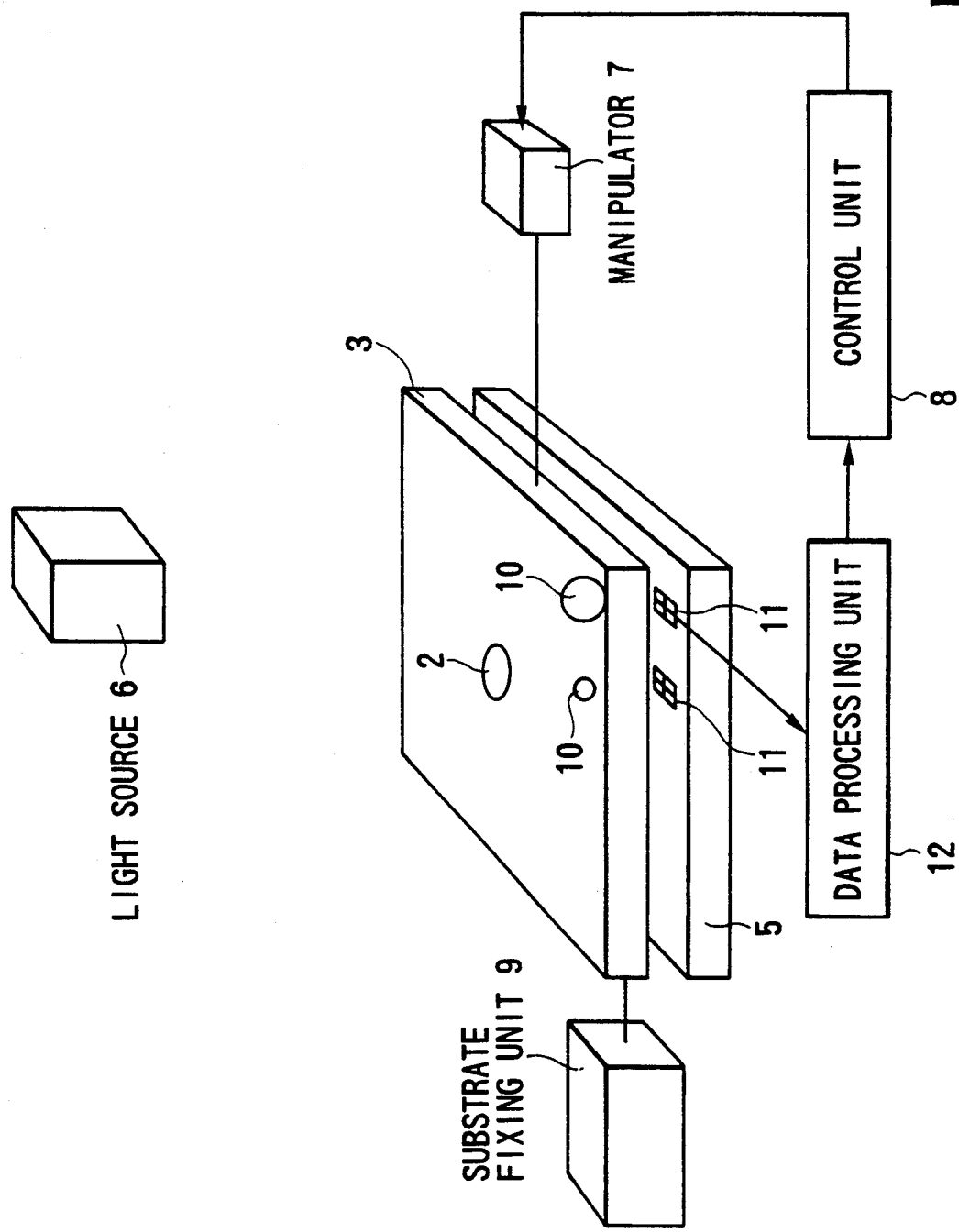
FIG. 2 is a perspective view for explaining a positioning apparatus according to the second embodiment of the present invention.

FIG. 2 shows a positioning apparatus according to the second embodiment of the present invention. This positioning apparatus comprises elliptical positioning lenses 10, each constituted by, e.g., a distributed index planar microlens and designed to form a beam having an astigmatism, a transparent substrate 3 on which an optical component 2 such as a grating or a microlens is formed, a plurality of positioning light-receiving element arrays 11, an optical element substrate 5 on which elements such as light-emitting elements and light-receiving elements are formed, a light source 6 such as a laser for radiating parallel beams on the transparent substrate 3, a manipulator 7 for moving the transparent substrate 3, a data processing unit 12 constituted by operational amplifiers and designed to obtain a differential signal based on currents flowing in the light-receiving element arrays 11, a control unit 8 such as a personal computer for moving the manipulator 7 to reduce an output from the data processing unit 12 to zero, and a substrate fixing unit 9 for coating a photo-setting resin to the transparent substrate 3 and the optical element substrate 5 to fix them together.

An operation of the apparatus will be described below. Parallel beams emitted from the light source 6 are caused to be vertically incident on the positioning lenses 10 on the transparent substrate 3. As described with reference to FIG. 4, the control unit 8 moves the manipulator in a direction parallel to the substrate so as to reduce a differential signal based on currents flowing in the light-receiving element arrays 11. In this case, the actual positioning is performed in accordance with the principle described with reference to FIG. 3. When the manipulator is located at a position where the differential signal based on the currents flowing in the light-receiving element arrays 11 is minimized, the control unit 8 moves the manipulator 7 in a direction perpendicular to the substrate 3 so as to reduce the current output from the data processing unit 12 to zero. When the two substrates 3 and 5 are positioned in this manner, they are fixed to each other by the substrate fixing unit 9.

According to the present invention, since the positioning apparatus for optical element mounting operation performs positioning by using light, a transparent substrate and optical elements can be positioned with high precision.

What is claimed is:

1. A positioning apparatus for an optical element mounting operation, comprising:
   a transparent substrate on a surface of which at least one positioning lens and an optical system are formed;

a light source for emitting parallel beams which are vertically incident on said transparent substrate;

an optical element substrate on which a plurality of optical elements to be positioned with respect to said transparent substrate, and a positioning light-receiving element for receiving light focused by said positioning lens are formed;

current measuring means for measuring a current flowing in said positioning light-receiving element;

a manipulator for moving said transparent substrate with respect to said optical element substrate to perform positioning of said transparent substrate with respect to said optical element substrate; and control means for controlling said manipulator on the basis of a current measured by said current measuring means to perform positioning of said transparent substrate with respect to said optical element substrate.

2. An apparatus according to claim 1, wherein said control means controls movement of said manipulator so as to maximize the current measured by said current measuring means.

3. An apparatus according to claim 1, wherein said positioning leans comprises an elliptical lens, said positioning light-receiving element comprises a positioning light-receiving element array constituted by at least two light-receiving elements, and said control means controls movement of said manipulator so as to equalize currents flowing in said light-receiving elements of said positioning light-receiving element array.

4. An apparatus according to claim 1, further comprising a plurality of positioning lenses having different focal lengths, and a plurality of positioning light-receiving elements for respectively receiving light beams focused by said positioning lenses, wherein said control means controls an operation of said manipulator in a stepwise manner on the basis of a current flowing in each of said positioning light-receiving elements from those having larger defocus beam diameters.

5. An apparatus according to claim 1, wherein said control means performs positioning by moving said transparent substrate in a direction perpendicular to said optical element substrate after performing positioning by moving said transparent substrate in a direction parallel to a surface of said optical element substrate.

6. An apparatus according to claim 1, further comprising substrate fixing means for fixing said transparent substrate and said optical element substrate, positioned by said control means, to each other.

* * * * *